United States Patent
Nishimura et al.

(10) Patent No.: US 11,186,666 B2
(45) Date of Patent: Nov. 30, 2021

(54) ETHYLENE-VINYL ALCOHOL COPOLYMER COMPOSITION PELLETS, AND MULTILAYER STRUCTURE

(71) Applicant: THE NIPPON SYNTHETIC CHEMICAL INDUSTRY CO., LTD., Osaka (JP)

(72) Inventors: Daichi Nishimura, Osaka (JP); Takuya Nakajima, Osaka (JP); Masahiko Taniguchi, Osaka (JP); Koji Yamada, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/064,307

(22) PCT Filed: Dec. 28, 2016

(86) PCT No.: PCT/JP2016/089122
§ 371 (c)(1),
(2) Date: Jun. 20, 2018

(87) PCT Pub. No.: WO2017/115847
PCT Pub. Date: Jul. 6, 2017

(65) Prior Publication Data
US 2019/0002612 A1   Jan. 3, 2019

(30) Foreign Application Priority Data
Dec. 28, 2015 (JP) .............................. JP2015-255783

(51) Int. Cl.
| | | |
|---|---|---|
| C08F 216/06 | (2006.01) | |
| B65D 65/20 | (2006.01) | |
| B65D 65/40 | (2006.01) | |
| B29B 9/06 | (2006.01) | |
| C08L 29/04 | (2006.01) | |
| C08K 3/08 | (2006.01) | |
| C08K 3/11 | (2018.01) | |
| B32B 27/28 | (2006.01) | |
| B29B 9/12 | (2006.01) | |
| B32B 27/30 | (2006.01) | |

(52) U.S. Cl.
CPC .............. *C08F 216/06* (2013.01); *B29B 9/12* (2013.01); *B32B 27/28* (2013.01); *B32B 27/306* (2013.01); *B65D 65/20* (2013.01); *B65D 65/40* (2013.01); *C08K 3/08* (2013.01); *C08K 3/11* (2018.01); *C08L 29/04* (2013.01); *B29B 9/06* (2013.01); *C08F 2800/10* (2013.01); *C08K 2003/0856* (2013.01)

(58) Field of Classification Search
None
See application file for complete search history.

(56) References Cited

U.S. PATENT DOCUMENTS

| | | | | |
|---|---|---|---|---|
| 5,153,038 A | * | 10/1992 | Koyama ................. | B32B 27/18 428/35.8 |
| 6,391,406 B1 | * | 5/2002 | Zenner ................. | B65D 81/266 252/188.28 |
| 6,759,107 B1 | | 7/2004 | Tai et al. | |
| 2002/0055572 A1 | * | 5/2002 | Tai ........................... | B32B 27/08 524/413 |
| 2003/0040564 A1 | * | 2/2003 | Tung ...................... | B29C 48/288 524/434 |
| 2006/0116452 A1 | * | 6/2006 | Tsuji ........................ | B01J 20/22 524/104 |
| 2012/0128961 A1 | * | 5/2012 | Yoshida .................. | B32B 27/20 428/220 |
| 2013/0017383 A1 | | 1/2013 | Tai et al. | |
| 2014/0213701 A1 | | 7/2014 | Nonaka et al. | |
| 2016/0325909 A1 | * | 11/2016 | Niimi ........................ | A61J 1/03 |
| 2018/0355163 A1 | * | 12/2018 | Sato .......................... | C08K 3/11 |
| 2018/0371179 A1 | * | 12/2018 | Kani ......................... | B29B 9/06 |

FOREIGN PATENT DOCUMENTS

| | | |
|---|---|---|
| CN | 103097129 | 5/2013 |
| CN | 103635526 | 3/2014 |
| CN | 104185652 | 12/2014 |
| JP | H01-278344 | 11/1989 |
| JP | H6-127433 | 5/1994 |
| JP | H6-128433 | 5/1994 |
| JP | H07-330994 A | 12/1995 |
| JP | 2005-509049 A | 4/2005 |
| JP | 2008-230112 A | 10/2008 |
| TW | 201345929 | 10/2013 |

(Continued)

OTHER PUBLICATIONS

International Search Report from Patent Application No. PCT/JP2016/089122, dated Feb. 7, 2017, along with an English translation thereof.
International Preliminary Report on Patentability from Patent Application No. PCT/JP2016/089122, dated Jul. 3, 2018.
Singaporean Search Report issued for Singaporean Patent Application No. 11201804720P dated Jun. 26, 2019.
Supplemental European Search Report issued for EP Patent Application No. 16881821.9 dated Sep. 4, 2019.
TW Office Action w/Search Report issued in TW Patent App. No. 105143521 dated Feb. 17, 2020, English translation.

(Continued)

*Primary Examiner* — Sheeba Ahmed
(74) *Attorney, Agent, or Firm* — Greenblum & Bernstein, P.L.C.

(57) ABSTRACT

An ethylene-vinyl alcohol copolymer composition is provided, which contains an ethylene-vinyl alcohol copolymer and an iron compound, wherein the ethylene-vinyl alcohol copolymer has an ethylene content of 20 to 60 mol %, wherein the iron compound is present in a proportion of 0.01 to 100 ppm on a metal basis based on the weight of the ethylene-vinyl alcohol copolymer composition.

12 Claims, No Drawings

(56) References Cited

FOREIGN PATENT DOCUMENTS

WO     2013-146533     10/2013
WO     2013/146533 A1     10/2013

OTHER PUBLICATIONS

JP Office Action issued in JP Patent Application No. 2016-575983 dated Mar. 31, 2020, English translation.
CN Office Action issued in CN Patent Application No. 201680076493.4 dated Mar. 23, 2020, English translation.
CN Office Action issued in CN Patent Application No. 201680076493.4 dated Aug. 25, 2020, English translation.
SG Office Action issued in SG Patent Application No. 11201804720P dated Sep. 16, 2020.
Chen et al. "Influence of Trace Amount of Iron on UV Transmittance of Far Ultraviolet Transmitting Glass", Glass & Enamel, vol. 39, No. 4, Aug. 2011; partial English translation.
JP Office Action issued in JP Patent Application No. 2016-575983 dated Oct. 20, 2020, English translation.
TW Office Action issued in TW Patent Application No. 105143521 dated Dec. 3, 2020, English translation.
Office Action issued in Japanese Patent Application No. 2016-575983, dated Jul. 13, 2021, English translation.
Office Action issued in Chinese Patent Application No. 201680076493.4, dated Apr. 27, 2021, English translation.

\* cited by examiner

ETHYLENE-VINYL ALCOHOL COPOLYMER COMPOSITION PELLETS, AND MULTILAYER STRUCTURE

TECHNICAL FIELD

The present disclosure relates to pellets of an ethylene-vinyl alcohol copolymer composition containing an ethylene-vinyl alcohol copolymer (hereinafter sometimes referred to simply as "EVOH resin") as a main component and to a multilayer structure produced by using the EVOH resin composition. More specifically, the present disclosure relates to pellets of an EVOH resin composition having a UV absorbing ability and to a multilayer structure having at least one layer containing the EVOH resin composition.

BACKGROUND ART

EVOH resin is excellent in transparency, gas barrier property (e.g., oxygen barrier property), perfume retaining property, solvent resistance, oil resistance, mechanical strength, and the like, and is widely used for various packaging materials such as a food packaging material, a pharmaceutical product packaging material, an industrial chemical packaging material, and an agricultural chemical packaging material.

However, foods and pharmaceutical products are liable to be degraded or deteriorated by ultraviolet radiation. Therefore, packaging materials for packaging the foods and the pharmaceutical products are required to have a UV absorbing ability.

A typical method for imparting such a packaging material with a UV absorbing property is to include a UV absorber in a resin to be used for the packaging material. For example, a multilayer structure is proposed, which includes a polyolefin layer and an EVOH resin layer and has a UV transmittance reduced by including a UV absorber in a material for one of the layers or in materials for the respective layers (see, for example, PTL 1).

RELATED ART DOCUMENT

Patent Document

PTL 1: JP-A-2008-230112

SUMMARY OF INVENTION

However, the UV absorber is generally a low-molecular weight compound. Therefore, when the UV absorber is contained in the multilayer structure, the UV absorber is problematically liable to migrate to a surface of the multilayer structure through the resin, thereby being brought into contact with an article packaged with the multilayer structure or making the surface of the multilayer structure sticky.

Further, it is necessary to include a large amount of the UV absorber with the resin to impart the multilayer structure with a sufficient UV absorbing ability. As a result, the properties of the resin are liable to be deteriorated.

The present disclosure provides EVOH resin composition pellets imparted with an excellent UV absorbing property without containing a known UV absorber, and a multilayer structure.

In view of the foregoing, the inventors conducted intensive studies and, as a result, found that an EVOH resin composition containing an iron compound in a proportion of 0.01 to 100 ppm on a metal basis based on the weight of the EVOH resin composition has a satisfactory UV absorbing ability, and attained the present disclosure.

According to a first inventive aspect, there are provided EVOH resin composition pellets containing: an EVOH resin; and an iron compound; wherein the EVOH resin has an ethylene content of 20 to 60 mol %; and wherein the iron compound is present in a proportion of 0.01 to 100 ppm on a metal basis based on the weight of the EVOH resin composition.

According to a second inventive aspect, there is provided a multilayer structure that includes at least one layer containing the EVOH resin composition described above.

The inventive EVOH resin composition pellets are imparted with a satisfactory UV absorbing ability without including a UV absorber that is liable to migrate to the surface and impair the properties of the resin. Therefore, the inventive EVOH resin composition pellets are advantageously used for a packaging material for packaging an article that is liable to be degraded or deteriorated by ultraviolet radiation.

The multilayer structure including at least one layer containing the inventive EVOH resin composition has a satisfactory UV absorbing ability and, therefore, is particularly useful for a food packaging material.

DESCRIPTION OF EMBODIMENTS

The present disclosure will hereinafter be described in detail by way of preferred embodiments thereof. However, it should be understood that these preferred embodiments are illustrative of the disclosure but not limitative of the disclosure.

In the present disclosure, pellets of an EVOH resin composition contains an EVOH resin as a main component and 0.01 to 100 ppm of an iron compound on a metal basis based on the weight of the EVOH resin composition. The inventive EVOH resin composition contains the EVOH resin as a base resin. That is, the EVOH resin is typically present in a proportion of not less than 90 wt. %, preferably not less than 95 wt. %, more preferably not less than 97 wt. %, in the EVOH resin composition.

These components will hereinafter be described in detail.

[EVOH Resin]

The EVOH resin to be used in the present disclosure is generally a water-insoluble thermoplastic resin prepared by saponifying an ethylene-vinyl ester copolymer, which is a copolymer of ethylene and a vinyl ester monomer. Vinyl acetate is typically used as the vinyl ester monomer for economy.

Known polymerization methods such as a solution polymerization method, a suspension polymerization method, and an emulsion polymerization method may be used for the polymerization. A solution polymerization method using methanol as a solvent is generally used. The resulting ethylene-vinyl ester copolymer may be saponified by a known method.

The EVOH resin thus prepared mainly contains an ethylene structural unit and a vinyl alcohol structural unit, and further contains a very small amount of a vinyl ester structural unit that remains unsaponified.

A typical example of the vinyl ester monomer is vinyl acetate, which is readily commercially available and ensures a higher impurity treatment efficiency in the production process. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have 3 to 20 carbon atoms, preferably 4 to 10 carbon atoms, particularly preferably 4 to 7 carbon atoms. These vinyl esters may be used alone or, as required, a plurality of vinyl esters may be selected from these vinyl esters to be used in combination.

The EVOH resin has an ethylene structural unit content of 20 to 60 mol %, preferably 25 to 50 mol %, particularly preferably 25 to 35 mol %, which may be controlled by adjusting the pressure of ethylene in the copolymerization of the vinyl ester monomer and ethylene. If the ethylene structural unit content is too low, the EVOH resin tends to be poorer in high-humidity gas barrier property and melt formability. If the ethylene structural unit content is excessively high, on the other hand, the EVOH resin tends to be poorer in gas barrier property.

The ethylene content may be measured in conformity with ISO14663.

The EVOH resin typically has a vinyl ester saponification degree of 90 to 100 mol %, preferably 95 to 100 mol %, particularly preferably 99 to 100 mol %, which may be controlled by adjusting the amount of a saponification catalyst (typically, an alkaline catalyst such as sodium hydroxide), the temperature and the period for the saponification of the ethylene-vinyl ester copolymer. If the saponification degree is too low, the EVOH resin tends to be poorer in gas barrier property, heat stability, moisture resistance and the like.

The saponification degree of the EVOH resin may be measured in conformity with JIS K6726 (by using a solution prepared by homogenously dissolving the EVOH resin in a water/methanol solvent).

The EVOH resin typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR is excessively great, the EVOH resin tends to be unstable in a film forming process. If the MFR is too small, the EVOH resin tends to have an excessively high viscosity, resulting in difficulty in melt extrusion.

The MFR is an index of the polymerization degree of the EVOH resin, and may be controlled by adjusting the amount of a polymerization initiator and the amount of a solvent in the copolymerization of ethylene and the vinyl ester monomer.

The EVOH resin to be used in the present disclosure may further contain a structural unit derived from any of the following comonomers in a proportion that does not impair the effects of the present disclosure (e.g., in a proportion of not greater than 10 mol %).

The comonomers include: olefins such as propylene, 1-butene and isobutene, hydroxyl-containing α-olefins such as 3-buten-1-ol, 3-butene-1,2-diol, 4-penten-1-ol, and 5-hexene-1,2-diol, and esterification products, acylation products, and other derivatives of these olefins; hydroxyalkyl vinylidenes such as 2-methylenepropane-1,3-diol and 3-methylenepentane-1,5-diol; hydroxyalkyl vinylidene diacetates such as 1,3-diacetoxy-2-methylenepropane, 1,3-dipropionyloxy-2-methylenepropane, and 1,3-dibutyroyloxy-2-methylenepropane; unsaturated acids such as acrylic acid, methacrylic acid, crotonic acid, (anhydrous) phthalic acid, (anhydrous) maleic acid, and (anhydrous) itaconic acid, and salts and C1 to C18 monoalkyl and dialkyl esters of these unsaturated acids; acrylamide compounds such as acrylamide, C1 to C18 N-alkylacrylamides, N,N-dimethylacrylamide, 2-acrylamidopropanesulfonic acid, and salts thereof, and acrylamidopropyldimethylamine and acid salts and quaternary salts thereof; methacrylamide compounds such as methacrylamide, C1 to C18 N-alkylmethacrylamides, N,N-dimethylmethacrylamide, 2-methacrylamidopropanesulfonic acid, and salts thereof, and methacrylamidopropyldimethylamine and acid salts and quaternary salts thereof; N-vinylamides such as N-vinylpyrrolidone, N-vinylformamide, and N-vinylacetamide; cyanated vinyl compounds such as acrylonitrile and methacrylonitrile; vinyl ethers such as C1 to C18 alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; halogenated allyl compounds such as allyl acetate and allyl chloride; allyl alcohol compounds such as allyl alcohol and dimethoxyallyl alcohol; and trimethyl-(3-acrylamido-3-dimethylpropyl)-ammonium chloride and acrylamido-2-methylpropanesulfonic acid, which may be used alone or in combination.

A post-modified EVOH resin such as an urethanized, acetalized, cyanoethylated or oxyalkylenated EVOH resin may be used as the EVOH resin.

Particularly, the EVOH resin prepared by the copolymerization with any of the hydroxyl-containing α-olefins is preferred for excellent secondary formability. An EVOH resin having a 1,2-diol structure at its side chain is particularly preferred.

The EVOH resin to be used in the present disclosure may be a mixture of different EVOH resins. These EVOH resins may have different saponification degrees and different polymerization degrees, and contain different comonomer components.

[EVOH Resin Composition (Pellets)]

It is a feature of the present disclosure that the EVOH resin composition contains the iron compound in a proportion of 0.01 to 100 ppm on a metal basis based on the weight of the EVOH resin composition. The proportion of the iron compound is particularly preferably 1 to 80 ppm, further preferably 3 to 70 ppm, especially preferably 10 to 50 ppm.

If the proportion of the iron compound is too small, the EVOH resin composition tends to have an insufficient UV absorbing ability. If the proportion of the iron compound is excessively large, a product formed from the EVOH resin composition is liable to be colored.

The proportion of the iron compound may be determined by treating the EVOH resin composition containing the EVOH resin and the iron compound with an acid such as dilute sulfuric acid or hydrochloric acid, adding pure water to the resulting solution to a predetermined volume to prepare a sample solution and analyzing the sample solution by the atomic absorption spectrometry.

Examples of the iron compound include ferric oxide, ferrosoferric oxide, ferrous chloride, ferric chloride, ferrous hydroxide, ferric hydroxide, ferrous oxide, iron sulfate, and iron phosphate, which may be each present in the form of an iron salt, in an ionized form or in the form of a complex coordinated with the resin or other ligands in the EVOH resin composition.

In the present disclosure, exemplary methods for producing the inventive EVOH resin composition in pellet form include: (i) a method including the steps of adding the iron compound to a homogeneous solution (water/alcohol solution or the like) of the EVOH resin, extruding the resulting solution into a strand form in a coagulation liquid, cutting the resulting strands into pellets and drying the pellets in a process for producing the EVOH resin; (ii) a method including the steps of keeping pellets of the EVOH resin in contact with an aqueous solution of the iron compound to introduce the iron compound into the pellets of the EVOH resin, and drying the resulting pellets; (iii) a method including the steps of dry-blending pellets of the EVOH resin and the iron compound, and melt-kneading the resulting mixture; and (iv) a method including the steps of adding a predetermined amount of the iron compound to a melt of the EVOH resin, and melt-kneading the resulting mixture.

Particularly, the method (ii) is preferred because the EVOH resin composition produced by the method (ii) ensures more remarkable effects of the present disclosure without the need for an additional production step.

The EVOH resin composition pellets to be produced by the method (i) and the EVOH resin pellets to be used in the methods (ii) and (iii) may each have, for example, a spherical shape, a cylindrical shape, a cubic shape, an elongated cubic shape or the like. The pellets typically each have a spherical shape (rugby ball shape) or a cylindrical shape. The spherical pellets typically each have a diameter of 1 to 6 mm and a height of 1 to 6 mm, preferably a diameter of 2 to 5 mm and a height of 2 to 5 mm, and the cylindrical pellets typically each have a bottom face diameter of 1 to 6 mm and a length of 1 to 6 mm, preferably a bottom face diameter of 2 to 5 mm and a length of 2 to 5 mm, for easy handling of the pellets for use as a forming material.

The iron compound to be used in the methods (i), (iii) and (iv) is preferably a water-soluble iron compound. Examples of the water-soluble iron compound include iron salts (inorganic acid salts and the like) such as ferric oxide, ferrosoferric oxide, ferrous chloride, ferric chloride, ferrous hydroxide, ferric hydroxide, ferrous oxide, iron sulfate, iron sulfide, iron nitrate, and iron phosphate, which may be each present in the form of a salt, in an ionized form or in the form of a complex coordinated with the resin or other ligands in the EVOH resin as described above.

Usable as the aqueous solution of the iron compound in the method (ii) are an aqueous solution of any of the aforementioned iron compounds, and an aqueous solution that contains iron ions leached out of a steel material immersed in water containing chemical agents. In this case, the proportion (on a metal basis) of the iron compound in the EVOH resin composition may be controlled by adjusting the concentration of the iron compound in the aqueous solution in which the EVOH resin pellets are immersed, the immersion temperature, the immersion period and/or the like. The immersion period is typically 0.5 to 48 hours, preferably 1 to 36 hours, and the immersion temperature is typically 10° C. to 40° C., preferably 20° C. to 35° C.

The EVOH resin composition pellets are separated from the aqueous solution by a known method, and dried by a known drying method. Various drying methods are usable for the drying, and examples of the drying methods include a stationary drying method and a fluidized drying method, which may be used alone or in combination.

The inventive EVOH resin composition pellets typically have a water content of 0.01 to 0.5 wt. %, preferably 0.05 to 0.35 wt. %, particularly preferably 0.1 to 0.3 wt. %.

In the present disclosure, the water content of the EVOH resin composition pellets is measured and calculated in the following manner.

The weight ($W_1$) of the EVOH resin composition pellets is measured by an electronic balance, and the EVOH resin composition pellets are dried at 150° C. for 5 hours in a hot air dryer and cooled for 30 minutes in a desiccator. Then, the weight ($W_2$) of the resulting pellets is measured. The water content of the EVOH resin composition pellets is calculated from the following expression:

$$\text{Water content(wt. \%)}=[(W_1-W_2)/W_1]\times 100$$

In the aforementioned manner, the inventive EVOH resin composition pellets are produced.

The EVOH resin composition pellets thus produced may be subjected to a melt-forming process as they are, but a lubricant is preferably applied to surfaces of the pellets in order to ensure stable feeding of the pellets in the melt-forming process. Examples of the lubricant include higher fatty acids (e.g., lauric acid, myristic acid, palmitic acid, stearic acid, behenic acid, oleic acid, and the like), higher fatty acid esters (e.g., methyl esters, isopropyl esters, butyl esters, octyl esters, and the like of the higher fatty acids), higher fatty acid amides (saturated fatty acid amides such as stearamides and behenamides, unsaturated fatty acid amides such as oleamides and erucamides, and bis-fatty acid amides such as ethylene bisstearamide, ethylene bisoleamide, ethylene biserucamide, and ethylene bislauramide), low-molecular weight polyolefins (e.g., low-molecular weight polyethylenes and low-molecular weight polypropylenes having a molecular weight of about 500 to about 10,000, and acid modification products of these low-molecular weight polyolefins), higher alcohols, ester oligomers, and fluorinated ethylene resins. The higher fatty acids, and the esters and the amides of the higher fatty acids are preferred, and the higher fatty acid amides are further preferred. The proportion of the lubricant is typically not greater than 5 wt. %, preferably not greater than 1 wt. %, of the EVOH resin composition.

The inventive EVOH resin composition may further contain additives that are generally added to EVOH resin, as long as the effects of the present disclosure are not impaired.

[Multilayer Structure]

The inventive multilayer structure includes at least one layer containing the inventive EVOH resin composition. The layer containing the inventive EVOH resin composition (hereinafter referred to simply as "EVOH resin composition layer") is laminated with other base material mainly containing a thermoplastic resin other than the inventive EVOH resin composition (the resin used as the base material being hereinafter sometimes referred to simply as "base resin"), whereby the resulting multilayer structure is imparted with additional strength. Further, the EVOH resin composition layer is protected from an influence of water or the like, and is imparted with other functions.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure at a main chain and/or a side chain); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylate; ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acryl resins, polystyrene resins, vinyl ester resins, polyester elastomers, polyurethane elastomers, polystyrene elastomers, halogenated polyolefins such as chlorinated polyethylenes and chlorinated polypropylenes, and aromatic and aliphatic polyketones.

Of these resins, polyamide resins, polyolefin resins, polyester resins, and polystyrene resins, which are hydrophobic resins, are preferred. Further, polyolefin resins such as polyethylene resins, polypropylene resins and polycycloolefin resins, and unsaturated carboxyl-modified polyolefin resins obtained by modifying these polyolefin resins are more preferred, and polycycloolefin resins are particularly preferred as the hydrophobic resins.

Where layers a (a1, a2, . . . ) of the inventive EVOH resin composition and layers b (b1, b2, . . . ) of the base resin are stacked to form the multilayer structure, possible combinations of the layers a and the layers b include a/b, b/a/b, a/b/a, a1/a2/b, a/b1/b2, b2/b1/a/b1/b2, b2/b1/a/b1/a/b1/b2, and the like. Where the multilayer structure is configured to include recycle layers R obtained by recycling cutoff pieces and defective products occurring during the production of the multilayer structure and melt-forming the recycled material (a mixture including the inventive EVOH resin composition and the thermoplastic resin other than the inventive EVOH resin composition), possible combinations of the layers a, the layers b, and the layers R include b/R/a, b/R/a/b, b/R/a/R/b, b/a/R/a/b, b/R/a/R/a/R/b, and the like. The total number of the layers of the multilayer structure is typically 2 to 15, preferably 3 to 10.

In the aforementioned layered configuration, an adhesive resin layer containing an adhesive resin may be provided between the respective layers as required.

Known adhesive resins are usable as the adhesive resin. The adhesive resin is properly selected according to the type of the thermoplastic resin to be used for the base resin layer b. Typical examples of the adhesive resin include carboxyl-containing modified polyolefin polymers prepared by chemically bonding an unsaturated carboxylic acid or its anhydride to a polyolefin resin by an addition reaction, a graft reaction, or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride, which may be used alone or in combination as a mixture.

Where the adhesive resin layer is provided between the layer of the inventive EVOH resin composition and the base resin layer in the multilayer structure, the adhesive resin layer is present on at least one of opposite sides of the EVOH resin composition layer and, therefore, the adhesive resin is preferably hydrophobic.

The base resin and the adhesive resin may contain a plasticizer, a filler, a clay (montmorillonite or the like), a colorant, an antioxidant, an antistatic agent, a lubricant, a nucleating agent, an antiblocking agent, a wax, and the like in amounts that do not impair the effects of the present disclosure (e.g., in amounts of not greater than 30 wt. %, preferably not greater than 10 wt. %).

A conventional stacking method may be employed for stacking the layer of the inventive EVOH resin composition and the layer of the base resin (optionally with the adhesive resin layer provided between the layers). Examples of the stacking method include: a method in which a film or a sheet of the inventive EVOH resin composition is laminated with the base resin by melt extrusion; a method in which the base resin layer is laminated with the inventive EVOH resin composition by melt extrusion; a method in which the EVOH resin composition and the base resin are coextruded; a method in which the layer of the EVOH resin composition and the layer of the base resin are bonded together by dry laminating with the use of a known adhesive agent such as of an organic titanium compound, an isocyanate compound, a polyester compound, or a polyurethane compound; and a method in which a solution of the EVOH resin composition is applied on the base resin layer and a solvent is removed from the applied solution. Of these methods, the coextrusion method is preferred in consideration of costs and environmental concerns.

The multilayer structure described above may be further subjected to a (heat) stretching process as required. The stretching process may be a uniaxial stretching process or a biaxial stretching process. The biaxial stretching process may be a simultaneous stretching process or a sequential stretching process. A roll stretching method, a tenter stretching method, a tubular stretching method, a stretch blowing method, or a vacuum pressure forming method having a higher stretch ratio may be employed for the stretching process. A temperature for the stretching is typically selected from a range of 40° C. to 170° C., preferably about 60° C. to about 160° C., around the melting point of the multilayer structure. If the stretching temperature is too low, poorer stretchability will result. If the stretching temperature is excessively high, it will be difficult to ensure stable stretching.

The resulting multilayer structure may be further subjected to a heat-setting process to ensure dimensional stability after the stretching. The heat-setting process may be performed in a known manner. For example, the stretched multilayer structure (stretched film) is typically heat-treated at 80° C. to 180° C., preferably 100° C. to 165° C., for about 2 to about 600 seconds, while under tension.

Where the stretched multilayer film produced by using the inventive EVOH resin composition is used as a shrinkable film, for example, the stretched film may be cold-set so as to be imparted with a heat-shrinkable property by applying cold air over the stretched film without performing the above heat-setting process.

In some case, a cup-shaped or tray-shaped multilayer container may be produced from the inventive multilayer structure. For the production of the multilayer container, an ordinary drawing process is employed. Specific examples of the drawing process include a vacuum forming method, a pressure forming method, a vacuum pressure forming method, and a plug-assisted vacuum pressure forming method. Where a tube-shaped or bottle-shaped multilayer container (having a laminate structure) is produced from a multilayer parison (a hollow tubular preform to be blown), a blow molding process is employed. Specific examples of the blow molding process include an extrusion blow molding method (a twin head type, a mold shift type, a parison shift type, a rotary type, an accumulator type, a horizontal parison type, and the like), a cold parison blow molding method, an injection blow molding method and a biaxial stretching blow molding method (an extrusion type cold parison biaxial stretching blow molding method, an injection type cold parison biaxial stretching blow molding method, an injection inline type biaxial stretching blow molding method and the like). As required, the resulting multilayer structure may be subjected to a heating process, a cooling process, a rolling process, a printing process, a dry laminating process, a solution or melt coating process, a bag forming process, a deep drawing process, a box forming process, a tube forming process, a splitting process, or the like.

The thickness of the multilayer structure (or the stretched multilayer structure) and the thicknesses of the EVOH resin composition layer, the base resin layer, and the adhesive resin layer of the multilayer structure are properly determined according to the layered configuration, the type of the base resin, the type of the adhesive resin, the purpose, the package shape, the required physical properties, and the like of the multilayer structure. The thickness of the multilayer structure (or the stretched multilayer structure) is typically 10 to 5000 μm, preferably 30 to 3000 μm, particularly preferably 50 to 2000 μm. The thickness of the EVOH resin composition layer is typically 1 to 500 μm, preferably 3 to 300 μm, particularly preferably 5 to 200 μm. The thickness of the base resin layer is typically 5 to 30000 μm, preferably 10 to 20000 μm, particularly preferably 20 to 10000 μm. The thickness of the adhesive resin layer is typically 0.5 to 250 μm, preferably 1 to 150 μm, particularly preferably 3 to 100 μm.

The thickness ratio between the EVOH resin composition layer and the base resin layer of the multilayer structure (EVOH resin composition layer/base resin layer) (if these layers each include a plurality of layers, the thickness ratio between the thickest one of the EVOH resin composition layers and the thickest one of the base resin layers) is typically 1/99 to 50/50, preferably 5/95 to 45/55, particularly preferably 10/90 to 40/60. The thickness ratio between the EVOH resin composition layer and the adhesive resin layer of the multilayer structure (EVOH resin composition layer/adhesive resin layer) (if these layers each include a plurality of layers, the thickness ratio between the thickest one of the EVOH resin composition layers and the thickest one of the adhesive resin layers) is typically 10/90 to 99/1, preferably 20/80 to 95/5, particularly preferably 50/50 to 90/10.

Bags, cups, trays, tubes, bottles and other containers and lids produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, and pharmaceutical products.

In particular, the layer of the inventive EVOH resin composition has a satisfactory UV absorbing ability and, therefore, is particularly useful as a food packaging material, particularly, for packaging raw meat, ham, sausage, and other meat products, which are liable to be discolored due to ultraviolet radiation.

EXAMPLES

The present disclosure will hereinafter be described more specifically by way of examples thereof. However, it should be understood that the present disclosure be not limited to the examples within the scope of the present disclosure.

In the following examples, "parts" means "parts by weight" unless otherwise specified.

Example 1

An iron strip (an SS400 plate available from Daido Die & Mold Steel Solutions Co., Ltd. and having a size of 60 mm×60 mm×990 mm) was kept in contact with an aqueous solution of additives (an aqueous solution containing 206 ppm of acetic acid, 206 ppm of sodium dihydrogen phosphate, 28 ppm of calcium phosphate, 280 ppm of sodium acetate and 117 ppm of boric acid) for 24 hours, whereby an aqueous solution containing iron compound in a proportion of 30 ppm on a metal basis was prepared. Then, water containing pellets of an EVOH resin having an ethylene structural unit content of 44 mol %, a saponification degree of 99.6 mol % and an MFR of 12 g/10 minutes (as measured at 210° C. with a load of 2160 g) were brought into contact with (immersed in) the aqueous solution containing the additives and the iron compound, whereby the additives and the iron compound were introduced into the EVOH resin pellets. Thereafter, the resulting pellets were dried at 118° C. for 14 hours. Thus, pellets of an EVOH resin composition were produced.

After 10 ml of dilute sulfuric acid was added to 1 g of the EVOH resin composition pellets thus produced, the resulting mixture was heated at 250° C. on a hot plate for 1 hour. Then, the mixture was further heated on an electric stove for 2 hours, and then heated at 700° C. in an electric furnace for 4 hours. After the resulting sample was transferred from the electric furnace to the electric stove, 2 ml of hydrochloric acid and 3 to 4 ml of distilled water were added to the sample and boiled. The resulting sample was put in a measuring flask and diluted with distilled water. Then, a sample solution thus prepared was analyzed by an atomic spectrophotometer (Z-2300 available from Hitachi, Ltd.) and the proportion of the iron compound (on a metal basis) based on the weight of the EVOH resin composition pellets was determined.

By using the EVOH resin composition pellets thus produced, a water/isopropanol (4/6) solution containing the EVOH resin composition at a concentration of 5 wt. % was prepared. Then, the UV transmittance of the solution thus prepared was measured at a wavelength of 300 nm by UV-VIS SPECTROPHOTOMETER UV-2600 (available from Shimadzu Corporation).

The results are shown in Table 1.

Example 2

Pellets of an EVOH resin composition were produced in substantially the same manner as in Example 1, except that the iron strip was kept in contact with the aqueous solution of the additives for 3 hours and the iron compound was contained in a proportion of 6 ppm on a metal basis in the aqueous solution to be used for the immersion of the EVOH resin pellets.

The proportion of the iron compound (on a metal basis) based on the weight of the EVOH resin composition pellets was determined. Further, a water/isopropanol solution containing the EVOH resin composition at a concentration of 5 wt. % was prepared by using the EVOH resin composition pellets, and the UV transmittance of the aqueous solution was measured in the same manner as in Example 1.

The results are shown in Table 1.

Comparative Example 1

Pellets of an EVOH resin composition were produced in substantially the same manner as in Example 1, except that the aqueous solution of the additives was not kept in contact with the iron strip and, therefore, the iron compound was not contained in the aqueous solution to be used for the immersion of the EVOH resin pellets. Then, a water/isopropanol solution of the EVOH resin composition was prepared by using the EVOH resin composition pellets, and the UV transmittance of the solution was measured in the same manner as in Example 1.

The results are shown in Table 1.

TABLE 1

|  | Example 1 | Example 2 | Comparative Example 1 |
|---|---|---|---|
| Proportion (ppm) of iron compound (on metal basis) based on weight of EVOH resin composition pellets | 40 | 5 | 0 |
| UV transmittance (%) | 68.4 | 88.9 | 91.2 |

The above results indicate that the pellets of the EVOH resin compositions of Examples 1 and 2 each containing the iron compound in a specific proportion were satisfactory in UV absorbing ability with a lower UV transmittance as compared with the EVOH resin composition pellets of Comparative Example 1 not containing the iron compound.

While specific forms of the embodiments of the present disclosure have been shown in the aforementioned inventive examples, the inventive examples are merely illustrative of the disclosure but not limitative of the disclosure. It is contemplated that various modifications apparent to those skilled in the art could be made within the scope of the disclosure.

The inventive EVOH resin composition pellets are imparted with a satisfactory UV absorbing ability without including a UV absorber. Therefore, the inventive EVOH resin composition pellets are advantageously used for packaging materials for packaging foods and chemicals.

The invention claimed is:

1. A pellet of an ethylene-vinyl alcohol copolymer composition comprising:
   an ethylene-vinyl alcohol copolymer; and
   an iron compound;
   wherein the ethylene-vinyl alcohol copolymer has an ethylene content of 20 to 60 mol %;
   wherein the iron compound is present in a proportion of 0.01 to 40 ppm on a metal basis based on weight of the ethylene-vinyl alcohol copolymer composition; and
   wherein the ethylene-vinyl alcohol copolymer is present in a proportion of not less than 90 wt. % in the ethylene-vinyl alcohol copolymer composition.

2. A multilayer structure comprising at least one layer comprising an ethylene-vinyl alcohol copolymer composition,
   wherein the ethylene-vinyl alcohol copolymer composition comprises an ethylene-vinyl alcohol copolymer and an iron compound,
   wherein the ethylene-vinyl alcohol copolymer has an ethylene content of 20 to 60 mol %; and
   wherein the iron compound is present in a proportion of 0.01 to 40 ppm on a metal basis based on weight of the ethylene-vinyl alcohol copolymer composition; and
   wherein the ethylene-vinyl alcohol copolymer is present in a proportion of not less than 90 wt. % in the ethylene-vinyl alcohol copolymer composition.

3. The pellet of an ethylene-vinyl alcohol copolymer composition according to claim 1, wherein the pellet has a water content of 0.01 to 0.35 wt. %.

4. The pellet of an ethylene-vinyl alcohol copolymer composition according to claim 1, wherein the ethylene-vinyl alcohol copolymer has a vinyl ester saponification degree of 90 to 100 mol %.

5. The pellet of an ethylene-vinyl alcohol copolymer composition according to claim 1, wherein the ethylene-vinyl alcohol copolymer has a melt flow rate of 0.5 to 100 g/10 minutes as measured at 210° C. with a load of 2,160 g.

6. A method comprising:
   providing a pellet of an ethylene-vinyl alcohol copolymer composition according to claim 1, and
   melt-forming a product from the pellet.

7. The method according to claim 6, wherein at least one layer of a multilayer structure is melt-formed by using the pellet of an ethylene-vinyl alcohol copolymer composition.

8. The pellet of an ethylene-vinyl alcohol copolymer composition according to claim 1, wherein the iron compound is at least one selected from ferric oxide, ferrosoferric oxide, ferrous chloride, ferric chloride, ferrous hydroxide, ferric hydroxide, ferrous oxide, and iron phosphate.

9. The pellet of an ethylene-vinyl alcohol copolymer composition according to claim 1, wherein a lubricant is applied to a surface of the pellet of an ethylene-vinyl alcohol copolymer composition.

10. The multilayer structure according to claim 2, wherein the ethylene-vinyl alcohol copolymer has a vinyl ester saponification degree of 90 to 100 mol %.

11. The multilayer structure according to claim 2, wherein the ethylene-vinyl alcohol copolymer has a melt flow rate of 0.5 to 100 g/10 minutes as measured at 210° C. with a load of 2160 g.

12. The multilayer structure according to claim 2, wherein the iron compound is at least one selected from ferric oxide, ferrosoferric oxide, ferrous chloride, ferric chloride, ferrous hydroxide, ferric hydroxide, ferrous oxide, and iron phosphate.

* * * * *